May 2, 1967

G. KAESS ETAL 3,316,823

SEMI-AUTOMATIC APPARATUS FOR WITHDRAWING PHOTOGRAPHIC
FILM UNITS FROM A FILM PACK

Filed April 30, 1965

INVENTORS
Gary Kaess
and
David S. Wilson

BY Brown and Mikulka
and
John H. Coult

ATTORNEYS

United States Patent Office 3,316,823
Patented May 2, 1967

3,316,823
SEMI-AUTOMATIC APPARATUS FOR WITHDRAWING PHOTOGRAPHIC FILM UNITS FROM A FILM PACK
Gary Kaess, West Newton, and David S. Wilson, Rockland, Mass., assignors to Polaroid Corporation, Cambridge, Mass., a corporation of Delaware
Filed Apr. 30, 1965, Ser. No. 452,164
16 Claims. (Cl. 95—1)

This invention relates to apparatus utilized in conjunction with a camera of the type which accommodates a film pack, and more particularly to apparatus for withdrawing film units from the film pack.

Patents Nos. 3,079,849, filed Feb. 14, 1958, and 3,161,516, filed May 26, 1961, both assigned to the assignee of the present invention, illustrate the type of film pack used with this invention, commercially designated by the manufacturer as Types 107 and 108 film. Application Ser. No. 268,999 filed Mar. 29, 1963, now Patent No. 3,165,040 also assigned to the assignee of the present invention, describes the Model 100 camera back designed to accommodate the Types 107 and 108 film. Such a film pack encloses an assemblage of film units, each of which units comprises a photosensitive sheet, a print-receiving sheet, and a breakable pod containing processing fluid. To each film unit is attached a lead projecting from the film pack and camera back into access of the user of the camera. After the photosensitive sheet is exposed, the leader attached to that unit is withdrawn from the film pack and severed from the unit. This operation superposes the photosensitive sheet upon the print-receiving sheet, and in addition, causes the leading end of the film unit to project from the film pack into access of the user. The leading end is then grasped and the film unit is withdrawn from the film pack. During this withdrawal of the film unit, pressure-applying members within the camera back act upon opposed sides of the film unit, breaking the pod and causing the processing fluid to be distributed between the photosensitive and print-receiving sheets.

This two-step manual operation of first pulling the leader from the film pack, and then withdrawing the film unit by means of the leading end of the unit is quite satisfactory for normal consumer use. However, it has been found that when the camera accommodating such a film pack is incorporated, for example, into apparatus for use in identification work where hundreds or perhaps thousands of pictures are taken in relatively rapid succession, the wholly manual operation is too time consuming and laborious.

Accordingly, it is an object of this invention to provide semi-automatic apparatus for assisting in the withdrawal of film units from a film pack.

It is another object of this invention to provide semi-automatic apparatus for assisting in the withdrawal of the film units from a film pack which has a rapid and facile operation.

It is a further object of this invention to provide semi-automatic apparatus for assisting in the withdrawal of film units from a film pack which minimizes the possibility of the film units jamming during removal from the film pack.

Briefly, one form of the apparatus which constitutes the present invention comprises a carriage mounted to reciprocate to and from a film pack, on which carriage is arranged a manually operated, pivoted holding lever for retentively engaging a leader on a film unit, and a rotatably mounted, spring-biased clamping bar arranged to automatically engage and retain the leading end of a film unit against the carriage frame. In operation, a first stroke of the carriage into contiguity with the film pack brings the holding lever into a position whereby the leader projecting from the film pack can be manually engaged and retained against a portion of the carriage during a second stroke of the carriage away from the film pack. Withdrawal from the film pack of the leader brings the leading end of the film unit into an accessible position. At the end of a third stroke of the carriage into contiguity with the film pack, tripping means deflects the clamping bar away from the carriage frame and allows entry of the leading end of the film unit between the clamping bar and the carriage frame. As a fourth stroke of the carriage is initiated in a direction away from the film pack, the clamping bar engages the leading end of the film unit. Continuation of the fourth stroke of the carriage then withdraws the film unit from the film pack. At the extreme end of the fourth stroke, a release arrangement operates on the clamping bar to free the film unit from its retentive engagement by the clamping bar.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
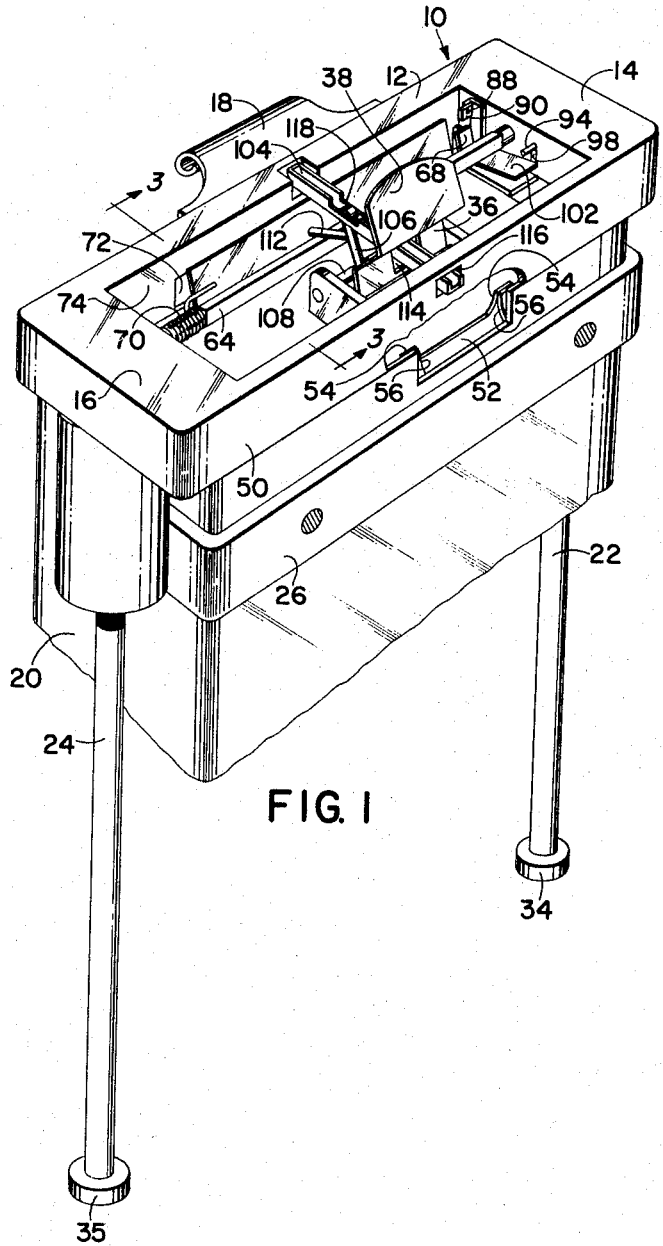
FIGURE 1 is a perspective view of the apparatus embodying the invention, the carriage being shown positioned in contiguity with the camera back.

The present invention is most suitably adapted for use with a film pack of the type described above enclosing an assemblage of film units, each film unit including a photosensitive sheet, a sheet which receives a print, and a breakable pod between the sheets containing a processing fluid. Each unit has a leader attached thereto which is drawn from the film pack after exposure of the photosensitive sheet to bring the print-receiving sheet into superposition with the photosensitive sheet. Withdrawal of the leader also causes the leading end of the film unit to pass between a pair of pressure-applying members mounted within the camera back and at one end thereof and to project from the film pack into an accessible position. The processing operation in the film unit is initiated by grasping the leading end of the film unit and pulling the film unit between the pressure-applying members to break the pod and distribute the processing fluid between the photosensitive and print-receiving sheets.

Referring to the drawings, and particularly to the FIG. 1 and FIG. 2 perspective views, it will be understood that by this invention the two-step operation of first withdrawing a leader 8 from the film pack and then subsequently withdrawing the film unit from the film pack is accomplished semi-automatically.

The apparatus constituting this invention includes a carriage 10 having a frame 12 with end pieces 14, 16. A handle 18 is attached to the frame 12 with screws 13. The carriage 10 is mounted to reciprocate to and from a camera back 20 on a pair of parallel guide tubes 22, 24 affixed to the carriage 10 and projecting therefrom in a plane transverse to the plane of the carriage 10. A U-shaped bracket 26 attached to the camera body 28 (shown as a ghost image in FIG. 2) has formed integrally therewith a pair of sleeves 30, 32. The sleeves 30, 32 have anti-friction bearing inserts 33 therein which slidably receive the guide tubes 22, 24. With this tube-and-sleeve mounting arrangement, the carriage 10 can be easily moved by hand to and from the camera back 20. Stops 34, 35 on the free ends of the guide tubes 22, 24 prevent the respective guide tube from escaping from its sleeve when the carriage 10 is moved to its extreme position away from the camera back 20.

As set forth above, the first step toward accomplishment of the withdrawal of the film unit from the film pack is to pull the leader 8 on a unit from the pack. In order to facilitate this withdrawal of a leader 8, a holding lever 36 is provided. The holding lever 36 is clearly shown in FIG. 3. The lever 36 has a manually engageable end 38 and a working end 40, and is pivotally mounted upon a pivot rod 42 supported by bracket arms 43 on the carriage 10, the pivot rod 42 passing through apertures (not shown) in a pair of lever tabs 46 formed integrally with the lever 36. The working end 40 of the lever 36 cooperates with a resilient insert 48 recessed into an anvil portion 50 of the carriage 10.

The holding lever 36 is normally spring-biased by a torsion spring (not shown) on the rod 42 out of engagement with the anvil portion 50 of the carriage 10 in order that the leader 8 may enter between the working end 40 of the holding lever 36 and the anvil portion 50 of the carriage 10 when the carriage 10 is brought into contiguity with the camera back 20.

Figure 2:
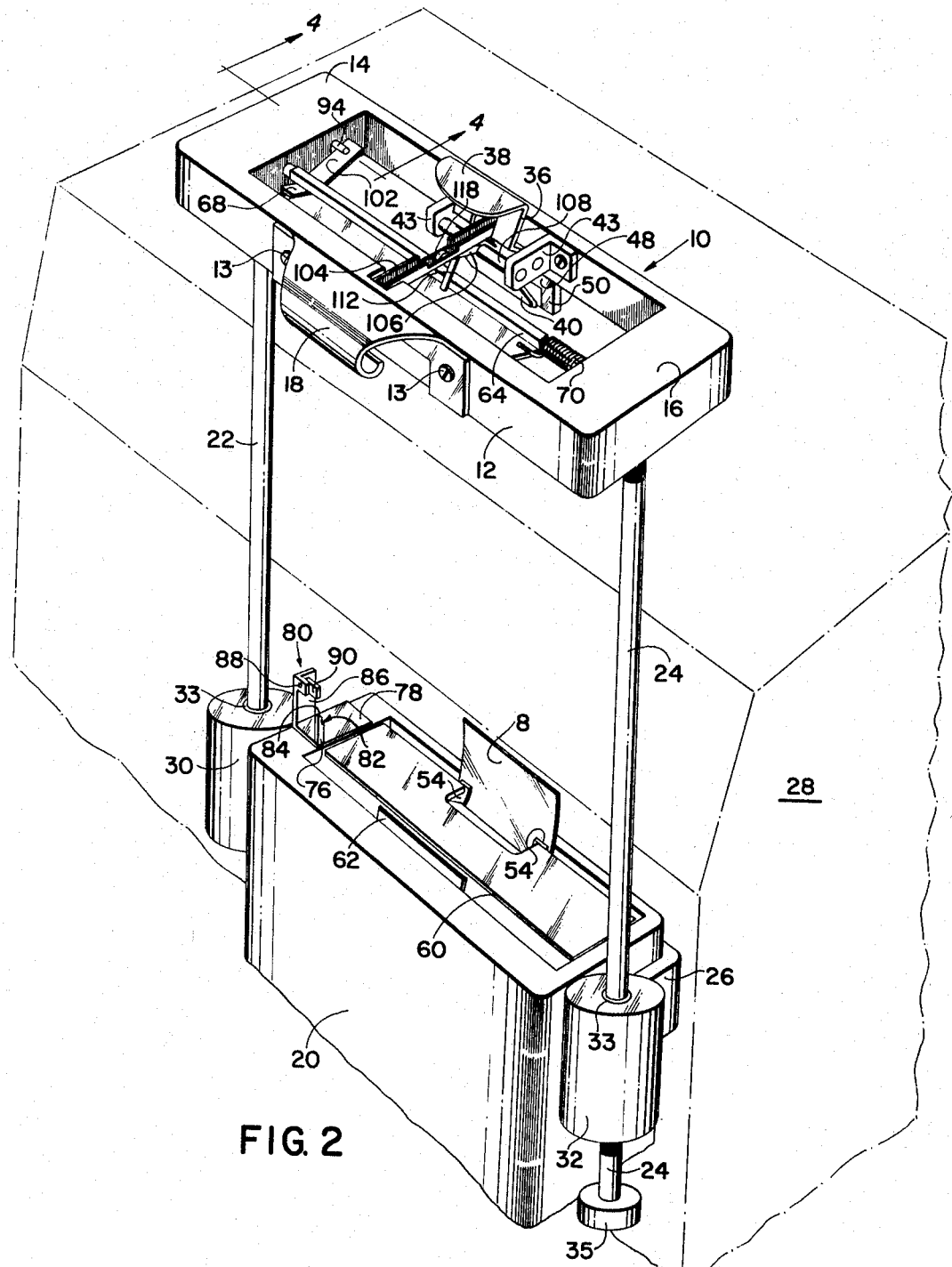
FIG. 2 is another perspective view of the apparatus embodying the invention with the carriage shown in position away from the camera back.

As shown in FIGS. 1 and 2, the camera back 20 has a slot 52 through which the leader 8 projects from the film pack. In order that the leader 8 projecting through the slot 52 will be properly positioned and of a planar configuration so as to enter unhindered between the working end 40 of the lever 36 and the anvil portion 50 of the carriage 10, support means for the leader 8 are employed. The support means comprises a pair of resilient fingers 54, 56 located adjacent each end of the slot 52, the fingers constituting each pair being biased into engagement with each other. As a leader 8 is drawn from the film pack through the slot 52 in the camera back 20, the pairs of fingers 54, 56 engage the side margins thereof, and give the leader 8 the proper position and configuration.

The operation accomplishing the withdrawal of the leader 8 from the film pack is as follows: (1) the carriage 10 is manually moved from a position away from the camera back 20 through a first stroke of the carriage 10 into contiguity with the camera back 20; at the end of this first stroke the leader 8 enters between the working end 40 of the holding lever 36 and the anvil portion 50 of the carriage 10; (2) the holding lever 36 is manually depressed, bringing the working end 40 of the lever 36 into engagement with the leader 8 and compressing it against the anvil portion 50 of the carriage 10; (3) the carriage 10 is moved through a second stroke away from the camera back 20, during which stroke the leader 8 is completely withdrawn from the film pack and severed from its connection with its film unit.

As indicated above, the withdrawal of the leader 8 from the film pack causes the leading end (shown at 58 in FIGS. 3 and 3A) of the attached film unit to project from the film pack.

In order that the film unit may be easily and rapidly withdrawn from the film pack and camera back 20, clamping means are provided on the carriage which automatically retentively engage the projecting leading end 58 of the film unit when the carriage 10 is again brought into contiguity with the camera back 20. However, before giving a detailed description of the clamping means, a short discussion will be presented concerning the leading end 58 of the film unit and structure employed to position the leading end 58 preparatory to its engagement by the clamping means.

Referring yet to FIGS. 1 and 2, it will be noted that a second slot 60 in the end of the camera back 20 provides an opening through which the leading end 58 of the film unit may project.

It is desirable that the leading end 58 of the film unit be properly positioned for withdrawal of the film unit from the film pack, and that any outward curling of the leading end 58 be prevented. To accomplish these ends, a spring strip 62 is mounted on the camera back 20 adjacent slot 60. As is evident from FIG. 2, in operation the spring strip 62 contacts the leading end 58 of the film unit and biases it inwardly toward the camera body 28 thereby resisting any tendency of the end 58 to curl outwardly away from the camera body 28 into an inaccessible position.

A detailed description will now be presented of the automatic clamping means. The clamping means comprises a clamping bar 64 rotatably mounted in the carriage frame end pieces 14, 16. The clamping bar 64 has a flap portion 66 along the greater part of its length and a transverse end extension 68 at one end thereof. The bar 64 is acted upon by a torsion spring 70 which biases the flap portion 66 of the bar 64 into engagement with a resilient insert 72 recessed into a flat clamping surface 74 on the frame 12.

As mentioned above, the clamping action of the clamping bar 64 against the clamping surface 74 on the frame 12 is effected automatically. This is accomplished by the provision of tripping means adjacent the camera back 20 for deflecting the clamping bar 64 away from the frame 12 as the carriage 10 is brought into contiguity with the camera back 20. With the bar 64 thus deflected, the leading end 58 of the film unit may enter between the bar 64 and surface 74.

Viewing especially FIG. 2, the tripping means for deflecting the clamping bar 64 comprises a trip finger 76 on a bracket 78 and a detent 80 disposed adjacent the trip finger 76. The trip finger 76 has a step 82 formed therein and a nib 84 at the tip thereof. The detent 80 includes a support leg 86 which mounts a pin 88 upon which a plate 90 is rotatably mounted. A torsion spring (not shown) provides angular bias for the plate 90.

The trip finger 76 and the detent 80 are disposed in the locus of travel of the end extension 68 of the clamping bar 64 as the carriage 10 travels to and from the camera back 20.

Figure 3:
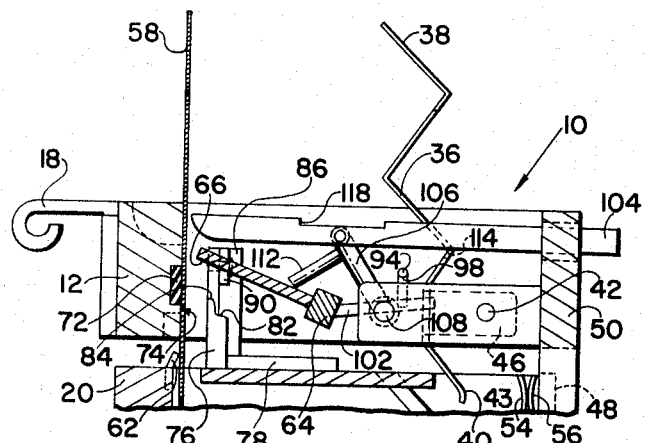
FIG. 3 is a fragmentary sectional view taken on lines 3—3 in FIGURE 1, showing the clamping bar constituting a part of the present invention out of engagement with the leading end of a film unit.

Referring to FIG. 3, during the operation of the automatic clamping means the carriage 10 is moved through a third stroke, in the context of a four stroke over-all operation required to withdraw a film unit from the film pack, into contiguity with the film pack. As the carriage 10 nears the end of the stroke, the end extension 68 of clamping bar 64 is engaged and deflected by the detent plate 90, thus causing the flap portion 66 of the clamping bar 64 to be rotated away from the clamping surface 74 of the frame 12. With the flap portion 66 of the clamping bar 64 in this position, the leading end 58 of the film unit enters between the flap portion 66 and the clamping surface 74.

Figure 3A:
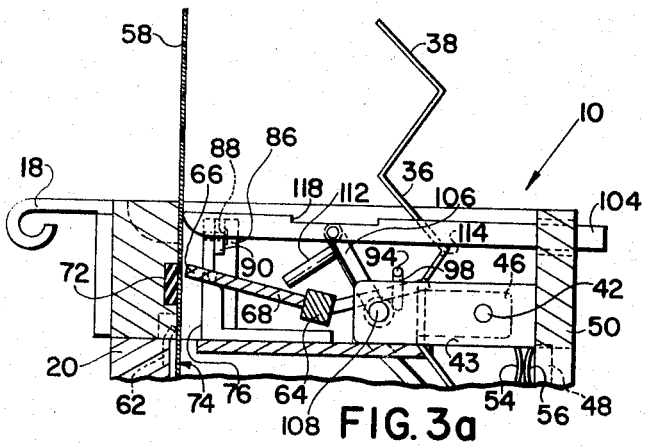
FIG. 3A is another fragmentary sectional view taken on lines 3—3 in FIGURE 1, but showing the clamping bar in engagement with the leading end of a film unit.

As the carriage continues to move toward the camera back 20, the end extension 68 will drop off the plate 90, being picked up again almost simultaneously by the nib 84 of the trip finger 76 (see FIG. 3A).

The effect of this sequence of movements of the end extension 68 on the action of the flap portion 66 of the clamping bar 64 is as follows. As the end extension 68 drops from the detent plate 90, the flap portion 66 is biased momentarily into engagement with the leading end 58 of the film unit. However, as the trip finger 76 picks up the end extension 68, the flap portion 66 is again rotated out of engagement with the film unit. When in this position the end extension 68 is supported on the step 82 of the trip finger 76, and the nib 84 at the tip of the trip finger 76 is located between the end extension 68 and the clamping surface 74.

It should be noted that the angular biasing force of the spring causes a pressure of the end extension 68 of the clamping bar 64 against the step 82 of the trip finger 76. The pressure is ineffective, however, to move the carriage 10 away from the camera back 20 because the nib 84 acts as a block to the rotation of the end extension 68 which would necessarily accompany a movement of the carriage 10 away from the camera back 20.

As the fourth stroke of the carriage 10 is initiated in the direction away from the camera back 20, the end extension 68 of the clamping bar 64 escapes from the trip finger 76, allowing the flap portion 66 of the clamping bar 64 to retentively engage the leading end 58 of the film unit and retain it against the clamping surface 74 of the frame 12 of the carriage 10. As the stroke is continued, the end extension 68 engages the detent plate 90; however, because the plate 90 is free to rotate when engaged from this direction, it passes the end extension 68 without exerting significant force thereon. Thus, during the remainder of the fourth stroke of the carriage 10 the film unit is held by the carriage 10, being withdrawn completely from the film pack.

Figure 4:
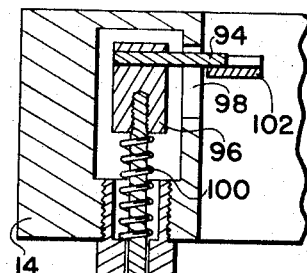
FIG. 4 is an enlarged fragmentary sectional view of the releasing means operating on the clamping bar to effect release of the film unit from the clamping bar.

In order to free the film unit from the clamping bar 64 at the end of the fourth stroke, automatic releasing means are provided. Referring to FIGS. 1, 2 and 4, the releasing means comprises a rod 92 received within guide tube 22. An element 94 projects transversely from a head 96 on the rod 92 through an elongated opening 98 in the end piece 14 of the frame 12. A compression spring 100 axially spring loads the rod 92. A release tab 102, forming a part of the clamping bar 64, extends in the path of travel of the element 94 as it moves in the opening 98. As the carriage 10 is pulled to its extreme position at the end of the fourth stroke, the sleeve 30 engages the stop 34 on the end of the rod 92. An additional movement of the carriage 10 displaces the rod 92 axially with respect to the guide tube 22 and thus draws the element 94 across the opening 98. The element 94 engages the release tab 102 on the clamping bar 64, rotating the clamping bar 64 against the bias of torsion spring 70 and freeing the film unit.

Guide tube 24 on the opposed side of the carriage 10 is sufficiently longer than guide tube 22 that its stop 35 will not engage sleeve 32 before the film unit has been released from the clamping bar 64. It is evident that the tube 24 could itself be a solid rod, or might enclose a spring-loaded rod and spring similiar to rod 92 and spring 100, if so desired.

It has been found that the operator of the apparatus is apt, without thinking, to depress the holding lever 36 during the third and fourth strokes of the carriage 10. If no means had been provided to prevent the effect of this action, the leader of the next succeeding film unit would be withdrawn at the same time as the prior film unit was being withdrawn from the film pack. This would cause the film units to jam.

To prevent this, interlock means have been provided. The interlock means comprises an interlock member 104 pivotally connected to a toggle link 106, which toggle link 106 is mounted to rotate upon a bar 108 supported by bracket arms 43 mounted on the frame 12. An arm 112 projects transversely from the link 106 toward the flap portion 66 of the clamping bar 64.

The interlock member 104 is received in an aperture 114 in the holding lever 36 and an opening 116 in the carriage frame 12. A notch 118 formed in one side of the interlock member 104 provides a space into which the holding lever 36 may rotate when the interlock member 104 is properly positioned. A torsion spring (not shown) provides a very light bias of the interlock member 104 forward toward the operator.

The operation of the interlock means will be evident from a reference to FIGS. 1, 2, 3 and 3A, taken in conjunction with the following description. During the first and second strokes of the carriage 10, the interlock means performs no function, the interlock member 104 being biased into its most forward position, as shown in FIG. 2. In this position, the notch 118 in the member 104 allows free operation of the holding lever 36.

At the start of the third stroke of the carriage 10, the interlock member 104 is biased into its most forward position; however, near the end of the stroke, the end extension 68 of the clamping bar 64 engages the detent plate 90 which causes the flap portion 66 of the clamping bar 64 to be moved away from the clamping surface 74. This movement is transmitted through the arm 112 to the toggle link 106 which shifts the interlock member 104 rearwardly to a second position. When in this position (see FIG. 3), the leading end 58 of the film unit is free to enter unobstructed between the clamping bar 64 and the carriage frame 12.

As the third stroke continues, the end extension 68 drops from the detent plate 90. Because the arm 112 is no longer held back by the flap portion 66 of the clamping bar 64, the spring acting on the interlock member 104 attempts to return the member 104 to its forward position. This is prevented, however, by the presence of the leading end 58 of the film unit which now blocks the path of travel of the interlock member 104, the end 58 being sufficiently stiff to resist the weak spring bias on the member 104.

When the interlock member 104 is disposed in this rearward position, the notch 118 is rearward of the path of travel of the holding lever 36, thus obstructing the holding lever 36 and rendering it inoperative to grasp the leader of the next succeeding film unit. As the film unit is released from the clamping bar 64 by the releasing means at the end of the fourth stroke, the interlock member 104 is again returned to its original forward position.

Thus, with the simple four stroke operation described above, the leader is manually engaged and withdrawn from the film pack, and the film unit is automatically clamped and withdrawn from the film pack with the additional feature that the film unit is released from the carriage at the end of the operation.

Since certain changes may be made in the above apparatus without departing from the scope of the invention herein involved, it is intended that all matter contained in the above description and shown in the accompanying drawings shall be interpreted as illustrative and not in a limiting sense.

What is claimed is:
1. Apparatus for assisting in the successive withdrawal of film units from a film pack of the type enclosing an assemblage of film units, each unit having a leader thereon which is withdrawn from the pack to cause the leading end of the film unit to project from the pack into access of the user, comprising, in combination:
  (a) a carriage including an anvil portion;
  (b) means mounting said carriage for reciprocatory movement to and from the film pack; and
  (c) holding means on said carriage manually operable to engage the leader of a film unit when said carriage is moved into contiguity with the film pack and to hold the leader during movement of said carriage away from the pack, said holding means comprising a pivoted, spring-biased lever having a working end opposite a manually engageable end, said lever being operable to engage and hold the leader against said anvil portion of said carriage.

2. Apparatus for assisting in the successive withdrawal of film units from a film pack of the type enclosing an assemblage of film units, each unit having a leader thereon which is withdrawn from the pack to cause the leading end of the film unit to project from the pack into access of the user, comprising in combination:

(a) a carriage;

(b) means mounting said carriage for reciprocatory movement to and from the film pack;

(c) clamping means automatically engaging the leading end of a film unit projecting from the film pack when said carriage is moved into contiguity with the film pack, wherein the film unit is withdrawn from the film pack during movement of said carriage away from the film pack; and (d) automatic releasing means freeing the film unit from said clamping means when said carriage is moved to an extreme position away from the film pack.

3. Apparatus for assisting in the successive withdrawal of film units from a film pack of the type enclosing an assemblage of film units, each unit having a leader thereon which is withdrawn from the pack to cause the leading end of the film unit to project from the pack into access of the user, comprising, in combination:

(a) a carriage including a frame;

(b) means mounting said carriage for reciprocatory movement to and from the film pack;

(c) tripping means mounted adjacent the film pack; and (d) clamping means on said carriage, said clamping means including a rotatably mounted clamping bar spring-biased into engagement with said frame when said carriage is positioned at a distance from the film pack, said tripping means deflecting said clamping bar away from said frame when said carriage is brought into contiguity with the film pack to allow the leading end of a film unit to enter between said bar and said frame, said bar escaping from said tripping means and retentively engaging the leading end of the film unit against said frame when said carriage is moved away from the film pack.

4. The apparatus of claim 3 wherein said means mounting said carriage comprises a pair of parallel guide members mounted on opposite sides of said carriage and a pair of sleeves disposed adjacent opposite sides of the film pack, said sleeves slidably receiving said guide members.

5. Apparatus for assisting in the successive withdrawal of film units from a film pack of the type enclosing an assemblage of film units, each having a leader thereon which is withdrawn from the pack to cause the leading end of the film unit to project from the pack into access of the user, comprising, in combination:

(a) a carriage including a frame;

(b) means mounting said carriage for reciprocatory movement to and from the film pack, said means comprising a pair of parallel guide members mounted on opposite sides of said carriage, one of said guide members being a tube, and said means comprising a pair of sleeves disposed adjacent opposite sides of the film pack, said sleeves slidably receiving said guide members;

(c) clamping means on said carriage, said clamping means including a rotatably mounted spring-biased clamping bar retentively engaging the leading end of a film unit projecting from the film pack when said carriage is in contiguity with the film pack; and (d) releasing means for freeing the film unit from said clamping bar when said carriage is moved to its extreme position away from the film pack, said releasing means comprising, in combination:

(1) an axially movable rod received in said guide tube, (2) an element on said rod projecting through an opening in said frame adjacent said clamping bar, and (3) spring means in said guide tube engaging said rod and said tube to provide an axial spring bias for said rod, said rod and said element being axially displaced with respect to said carriage upon attainment by said carriage of its extreme position away from the film pack whereby said element engages and deflects said clamping bar to free the film unit.

6. Apparatus for assisting in the successive withdrawal from a film pack of film units including respective leaders, comprising in combination:

(a) a carriage;

(b) means mounting said carriage for reciprocatory movement to and from the film pack;

(c) holding means on said carriage manually operable to retentively engage the leader of a film unit after a first stroke of said carriage into contiguity with the film pack, and to hold the leader during a second stroke of said carriage away from the film pack; and (d) clamping means automatically retentively engaging the leading end of a film unit projecting from the film pack after a third stroke of said carriage into contiguity with the film pack, said clamping means retaining the leading end of the film unit during a fourth stroke of said carriage away from the film pack to effect withdrawal of the film unit from the film pack.

7. Apparatus for assisting in the successive withdrawal from a film pack of film units including respective leaders, comprising, in combination:

(a) a carriage, including a frame and an anvil portion;

(b) means mounting said carriage for reciprocatory movement to and from the film pack;

(c) holding means on said carriage comprising a pivoted, spring-biased lever having a working end opposite a manually engageable end, said lever being manually operable to retentively engage the leader of a film unit against said anvil portion of said carriage after a first stroke of said carriage into contiguity with the film pack, and to hold the leader during a second stroke of said carriage away from the film pack; and (d) clamping means on said carriage, said clamping means including a rotatably mounted, spring-biased clamping bar, said clamping bar engaging the leading end of a film unit against said frame after a third stroke of said carriage into contiguity with the film pack, said clamping bar retaining the leading end of the film unit during a fourth stroke of said carriage away from the film pack to effect withdrawal of the film unit from the film pack.

8. Apparatus for assisting in the successive withdrawal from a film pack of film units including respective leaders, comprising, in combination:

(a) a carriage;

(b) means mounting said carriage for reciprocatory movement to and from the film pack;

(c) holding means on said carriage manually operable to retentively engage the leader of a film unit after a first stroke of said carriage into contiguity with the film pack, and to hold the leader during a second stroke of said carriage away from the film pack;

(d) clamping means automatically retentively engaging the leading end of the film unit projecting from the film pack after a third stroke of said carriage into contiguity with the film pack, said clamping means retaining the leading end of the film unit during a fourth stroke of said carriage away from the film pack to effect withdrawal of the film unit from the film pack; and (e) interlock means on said carriage including an interlock member, said interlock member having a first position providing for unobstructed manual operation of said holding means, and said interlock member having a second position wherein manual operation of said holding means is obstructed to prevent inadvertent engagement and withdrawal of the leader of the next successive film unit simultaneously with the withdrawal of the prior film unit from the film pack.

9. Apparatus for assisting in the successive withdrawal from a film pack of film unit including respective leaders, comprising, in combination:
(a) a carriage, including a frame and an anvil portion;
(b) means mounting said carriage for reciprocatory movement to and from the film pack;
(c) holding means on said carriage comprising a pivoted, spring-biased lever having a working end opposite a manually engageable end, said lever being manually operable to retentively engage the leader of a film unit against said anvil portion of said carriage after a first stroke of said carriage into contiguity with the film pack, and to hold the leader after a second stroke of said carriage away from the film pack;
(d) tripping means mounted adjacent the film pack;
(e) clamping means on said carriage, said clamping means including a rotatably mounted clamping bar spring-biased into engagement with said frame, said tripping means deflecting said bar away from said frame at the end of a third stroke of said carriage into contiguity with the film pack to allow the leading end of a film unit projecting from the film pack to enter between said bar and said frame, said bar engaging and retaining the film unit during a fourth stroke of said carriage away from the film pack to effect withdrawal of the film unit form the film pack; and
(f) interlock means on said carriage comprising, in combination:
(1) an interlock member mounted for rectilinear movement relative to said carriage, said member having a notch therein,
(2) spring means biasing said member into a first position during said first stroke wherein said notch provides space for unobstructed manual operation of said holding means, and
(3) means operable by said clamping means to move said member to a second position wherein manual operation of said holding means is obstructed to prevent inadvertent withdrawal of the leader of the next succeeding film unit simultaneously with the withdrawal of the prior film unit from the the film pack.

10. Apparatus for assisting in the successive withdrawal from a film pack of film units including respective leaders, comprising, in combination:
(a) a carriage including a frame;
(b) means mounting said carriage for reciprocatory movement to and from the film pack, said means comprising, in combination:
(1) a pair of parallel guide members mounted on opposite sides of said carriage, and
(2) a pair of sleeves disposed adjacent opposite sides of the film pack, said sleeves slidably receiving said guide members;
(c) holding means on said carriage, said holding means being manually operable to retentively engage the leader on a film unit after a first stroke of said carriage into contiguity with the film pack, and to hold the leader during a second stroke of said carriage away from the pack; and
(d) clamping means on said carriage, said clamping means including a rotatably mounted, spring-biased clamping bar, said clamping bar automatically engaging and retaining the leading end of a film unit against said frame after a third stroke of said carriage into contiguity with the film pack, said clamping bar retaining said film unit during a fourth stroke of said carriage away from the film pack to effect withdrawal of the film unit from the film pack.

11. Apparatus for assisting in the successive withdrawal from a film pack of film units including respective leaders, comprising, in combination:
(a) a carriage including a frame and an anvil portion;
(b) means mounting said carriage for reciprocatory movement to and from the film pack, said means comprising:
(1) a pair of parallel guide members mounted on opposite sides of said carriage, one of said guide members being a tube, and
(2) a pair of sleeves disposed adjacent opposite sides of the film pack, said sleeves slidably receiving said guide members;
(c) holding means on said carriage comprising a pivoted, spring-biased lever having a working end opposite a manually engageable end, said lever having a centrally disposed aperture, said lever being manually operable to retentively engage the leader of a film unit against said anvil portion of said carriage after a first stroke of said carriage into contiguity with the film pack, and to hold the leader during a second stroke of said carriage away from the pack;
(d) tripping means mounted adjacent the film pack, said tripping means comprising, in combination:
(1) a detent plate adapted to rotate in a direction away from the film pack, and
(2) a trip finger;
(e) clamping means on said carriage, said clamping means including a rotatably mounted clamping bar spring-biased into engagement with said frame, said detent plate and said trip finger deflecting said bar away from said frame during the third stroke of said carriage into contiguity with the film pack to allow the leading end of a film unit to enter between said bar and said frame, said clamping bar engaging and retaining the film unit during the fourth stroke of said carriage away from the film pack to effect withdrawal of the film unit from the film pack;
(f) interlock means comprising:
(1) an interlock member received in said aperture in said lever, said member having a notch therein,
(2) a toggle link supported by said carriage frame and pivotally connected to said interlock member to provide rectilinear motion for said interlock member relative to said carriage,
(3) an arm on said toggle lever extending toward said clamping bar and positioned to be engaged by said clamping bar when said clamping bar is deflected,
(4) spring means biasing said member into a forward position wherein said notch provides space for unobstructed manual operation of said holding lever, said interlock member being moved to a rearward position when said clamping bar is deflected wherein said notch is moved beyond the locus of travel of said holding lever and manual operation of said holding lever is obstructed to prevent inadvertent withdrawal of the leader of the next succeeding film unit simultaneously with the withdrawal of the prior film unit from the film pack; and
(g) releasing means for freeing the film unit from said clamping bar when said carriage is moved to its extreme position away from the film pack during said fourth stroke of said carriage, said releasing means comprising:
(1) an axially movable rod received in said guide member, and
(2) an element on said rod projecting through an opening in said frame adjacent said clamping bar, said rod and said element being axially displaced with respect to said carriage upon attainment by said carriage of its extreme position away from said film pack, said element engaging and deflecting said clamping bar to free the film unit.

12. Apparatus for assisting in the successive withdrawal of film units from a film pack of the type enclosing an assemblage of film units, each unit having a leader thereon which is withdrawn from the pack to cause the leading end of the film unit to project from the pack into access of the user, comprising, in combination:
  (a) a camera back enclosing the film pack, said camera back having a slot therein for admitting the leader on a film unit;
  (b) support means mounted on said camera back adjacent said slot, said means positioning and controlling the configuration of a leader projecting through said slot;
  (c) a carriage;
  (d) means mounting said carriage on said camera back for reciprocatory movement to and from said camera back; and
  (e) holding means on said carriage manually operable to retentively engage the leader positioned by said support means when said carriage is moved into contiguity with said camera back and to hold the leader during movement of said carriage away from said camera back.

13. The apparatus of claim 12, wherein said support means comprises two pair of resilient fingers, one pair adjacent each end of said slot, the fingers of each pair being biased toward each other.

14. Apparatus for assisting in the successive withdrawal of film units from a film pack of the type enclosing an assemblage of film units, each unit having a leader thereon which is withdrawn from the pack to cause the leading end of the film unit to project from the pack into access of the user, comprising, in combination:
  (a) a camera back enclosing a film pack, said camera back having a first slot therein for admitting the leader on a film unit and a second slot therein for admitting the leading end of a film unit;
  (b) support means mounted on said camera back adjacent said first slot, said means positioning and controlling the configuration of a leader projecting through said first slot;
  (c) a spring strip mounted on said camera back adjacent said second slot, said spring strip positioning the leading end of a film unit projecting through said second slot;
  (d) a carriage;
  (e) means mounting said carriage on said camera back for reciprocatory movement to and from said camera back;
  (f) holding means on said carriage manually operable to retentively engage the leader of the film unit projecting through said first slot and positioned by said support means after a first stroke of said carriage into contiguity with the camera back, and to hold the leader during a second stroke of said carriage away from said camera back; and
  (g) clamping means automatically retentively engaging the leading end of a film unit projecting through said second slot after a third stroke of said carriage into contiguity with said camera back said means retaining the leading end of the film unit during a fourth stroke of said carriage away from said camera back to effect withdrawal of the film unit from the film pack.

15. Apparatus for assisting in the successive withdrawal of film units from a film pack of the type enclosing an assemblage of film units, each unit having a leader thereon which is withdrawn from the pack to cause the leading end of the film unit to project from the pack into access of the user, comprising, in combination:
  (a) a camera back enclosing a film pack, said camera back having a first slot therein for admitting the leader on a film unit and a second slot for admitting the leading end of a film unit;
  (b) support means mounted on said camera back adjacent said first slot, said support means positioning and controlling the configuration of a leader projecting through said first slot, said support means comprising two pair of resilient fingers, one pair adjacent each end of said first slot, the fingers of each pair being biased toward each other, said pairs of resilient fingers supporting marginal portions on the opposed sides of the leader;
  (c) a spring strip mounted on said camera back adjacent said second slot, said spring strip positioning the leading end of a film unit projecting through said second slot;
  (d) a carriage, including a frame and an anvil portion;
  (e) means mounting said carriage on said cemera back for reciprocatory movement to and from said camera back;
  (f) holding means on said carriage comprising a pivoted, spring-biased lever having a working end opposite a manually engageable end, said lever being manually operable to retentively engage the leader of a film unit projecting through said first slot and positioned by said support means against said anvil portion of said carriage after a first stroke of said carriage into contiguity with said camera back, and to hold the leader during a second stroke of said carriage away from said camera back; and
  (g) clamping means on said carriage, said clamping means including a rotatably mounted, spring-biased clamping bar, said clamping bar engaging the leading end of a film unit projecting through said second slot and positioned by said spring strip against said frame after a third stroke of said carriage into contiguity with said camera back, said clamping bar retaining the leading end of the film unit during a fourth stroke of said carriage away from said camera back to effect withdrawal of the film unit from the film pack.

16. Apparatus for assisting in the successive withdrawal of film units from a film pack of the type enclosing an assemblage of film units, each unit having a leader thereon which is withdrawn from the pack to cause the leading end of the film unit to project from the pack into access of the user, comprising, in combination:
  carriage means reciprocally mounted for movement to and from the film pack, including film unit clamping means and leader holding means for successively engaging and withdrawing the leader and then the film unit from the film pack.

No references cited.

NORTON ANSHER, *Primary Examiner.*

R. M. SHEER, *Assistant Examiner.*